United States Patent [19]
Karasawa

[11] Patent Number: 5,295,232
[45] Date of Patent: Mar. 15, 1994

[54] VECTOR-SORT DRAFTING METHOD FOR AN AUTOMATIC DRAFTING MACHINE

[75] Inventor: Isao Karasawa, Tokyo, Japan

[73] Assignee: Mutoh Industries, Ltd., Tokyo, Japan

[21] Appl. No.: 737,123

[22] Filed: Jul. 30, 1991

[30] Foreign Application Priority Data

Nov. 16, 1990 [JP] Japan ................................. 2-310629

[51] Int. Cl.$^5$ ............................................. G06K 15/00
[52] U.S. Cl. ..................................... 395/105; 395/103
[58] Field of Search ..................................... 400/16–17, 400/18, 21; 346/67, 62, 68, 111, 134, 154; 395/103, 105, 117, 101, 115

[56] References Cited
U.S. PATENT DOCUMENTS

4,620,288 10/1986 Welmers .............................. 395/103
4,962,464 10/1990 Henzi et al. .......................... 395/103

*Primary Examiner*—Arthur G. Evans
*Attorney, Agent, or Firm*—Sughrue, Mion, Zinn, Macpeak & Seas

[57] ABSTRACT

A vector sort method in an automatic drafting machine has a purpose of reducing the movement distance of the pen in the X-axis direction relative to a paper sheet. Consequently, the automatic drafting machine drafts in sequence the particular vector segment data of the plurality of vector segment data within one drafting range transferred to the controller of the automatic drafting machine, which particular data having end points near the origin O in the X-axis direction, except mid points and drawn end points.

5 Claims, 7 Drawing Sheets

VECTOR-SORT DRAFTING METHOD FOR AN AUTOMATIC DRAFTING MACHINE

BACKGROUND OF THE INVENTION

The present invention relates to a vector-sort drafting method of an automatic drafting machine, in which a line drafting head is sent relatively along a X-axis direction to a sheet of paper, and along a Y-axis direction transversing the paper sheet, and a writing instrument held in the line drafting head draws a predetermined pattern on the paper sheet.

Figure 5:
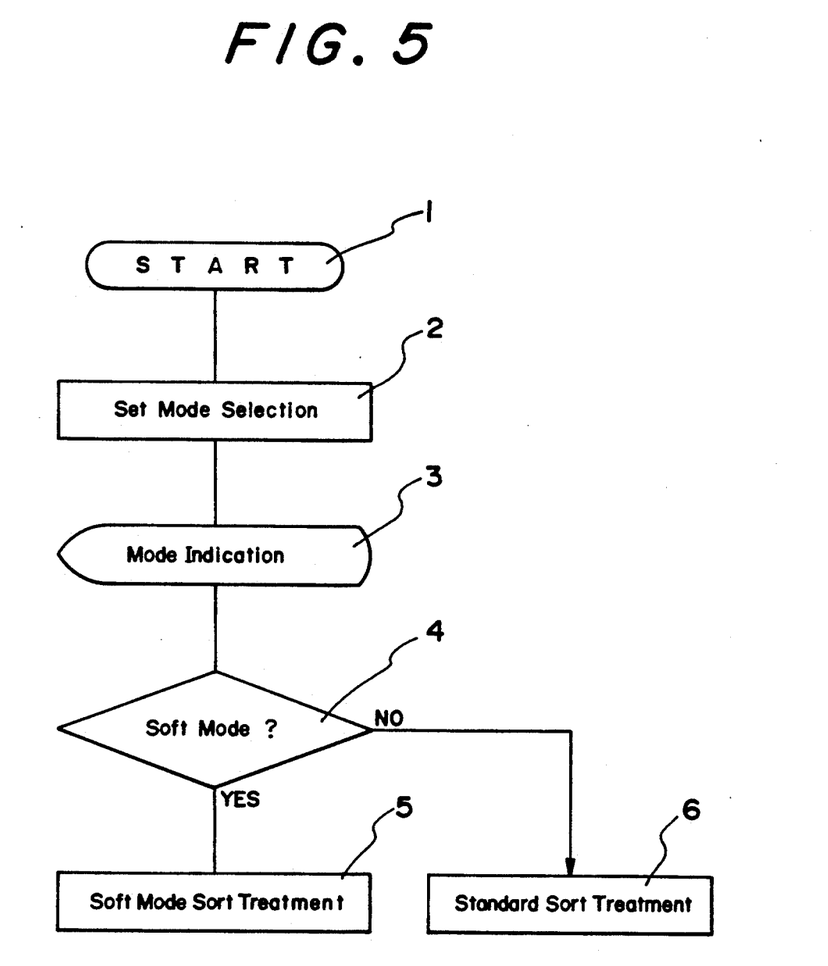
FIG. 5 is another flow chart of the operation of the drafting machine.
Figure 6:
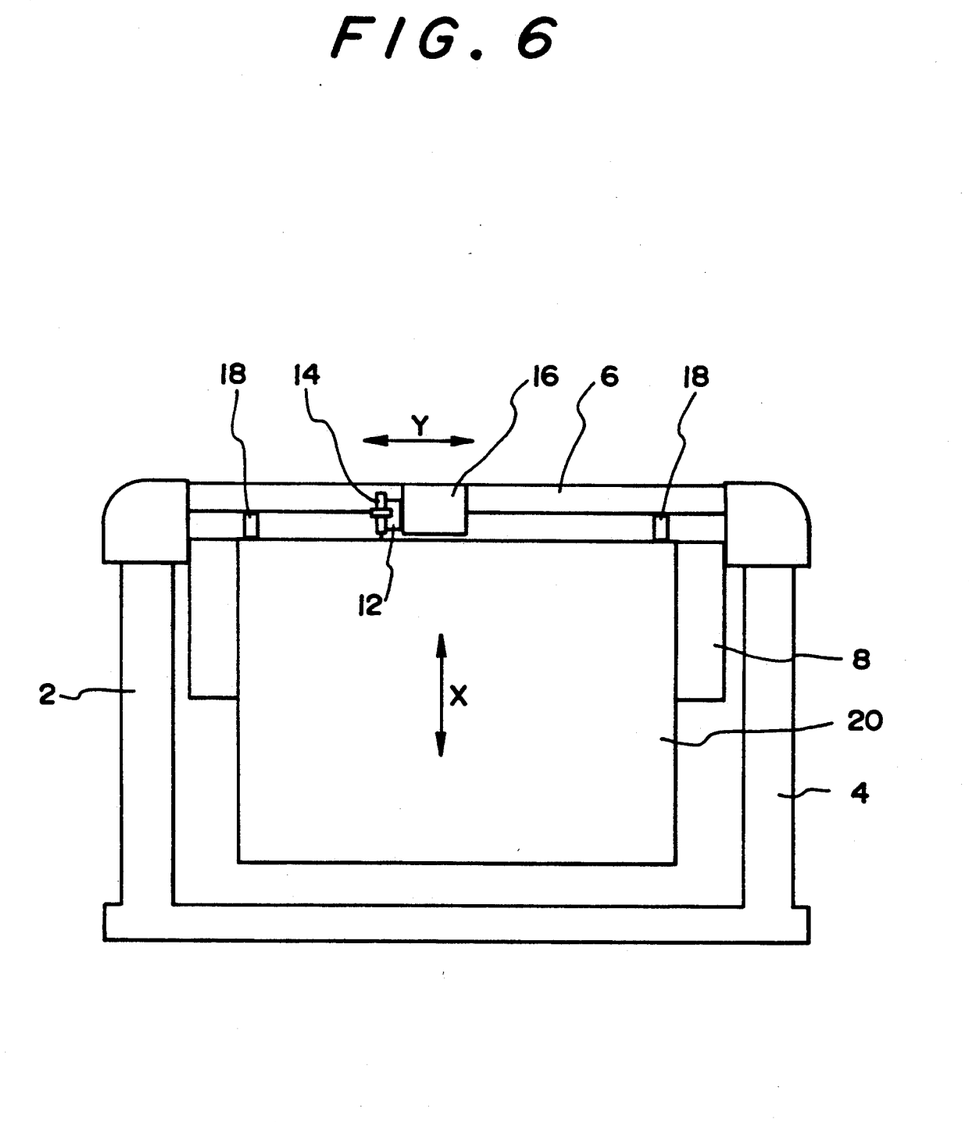
FIG. 6 is a front view of the paper drive type automatic drafting machine.
Figure 7:
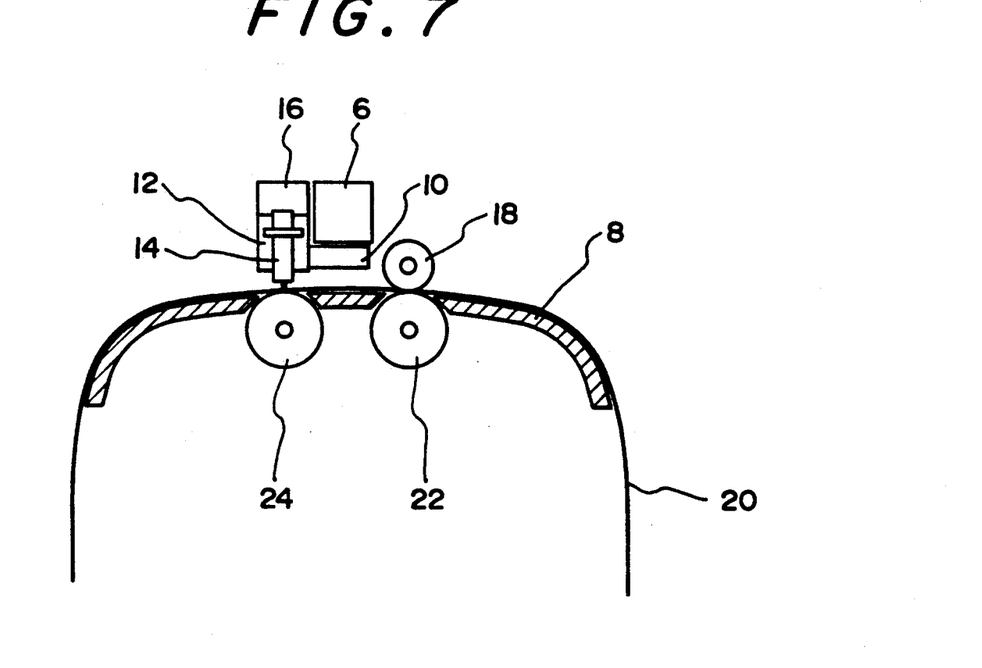
FIG. 7 is a side view of such automatic drafting machine.

As shown in FIGS. 5 to 7, which illustrate a sheet driven type automatic drafting machine, the machine comprises a Y rail 6 bridging between leg members 2 and 4, a platen 8 situated below the Y rail 6 and secured between the leg members 2 and 4, a line drawing head 16 movably connected to the Y rail 6 through a Y carsol 10, a pen holder 12 connected to an elevating and lifting drive apparatus in order to hold a writing instrument such as a pen 14 therein, a drive roller 22 and a pressing roller 18 for gripping therebetween the paper sheet 20 sliding on the platen 8 for feeding the sheet in the X direction along the platen 8, a drafting roller 24 having substantially the same circumferential speed as that of the drive roller 22 and being driven along the same direction as that of the drive roller, a X motor for driving the drive roller 22 and the drafting roller 24, a Y motor for driving the line drawing head 16 along the Y rail 6, and a controller stored in a casing (not shown) situated below the platen 8 so as to control the elevation drive control apparatus placed within the line drawing head 16.

According to the conventional automatic drafting machine, the paper sheet 20 is transferred along the platen 8 in the X direction on the basis of the pattern drafting data transferred from the host computer to the controller and the line drawing head 16 is moved along the Y rail 6 transverse to the platen 8 to draft fixed patterns on the paper sheet 20 by a pen 14.

Figure 8:
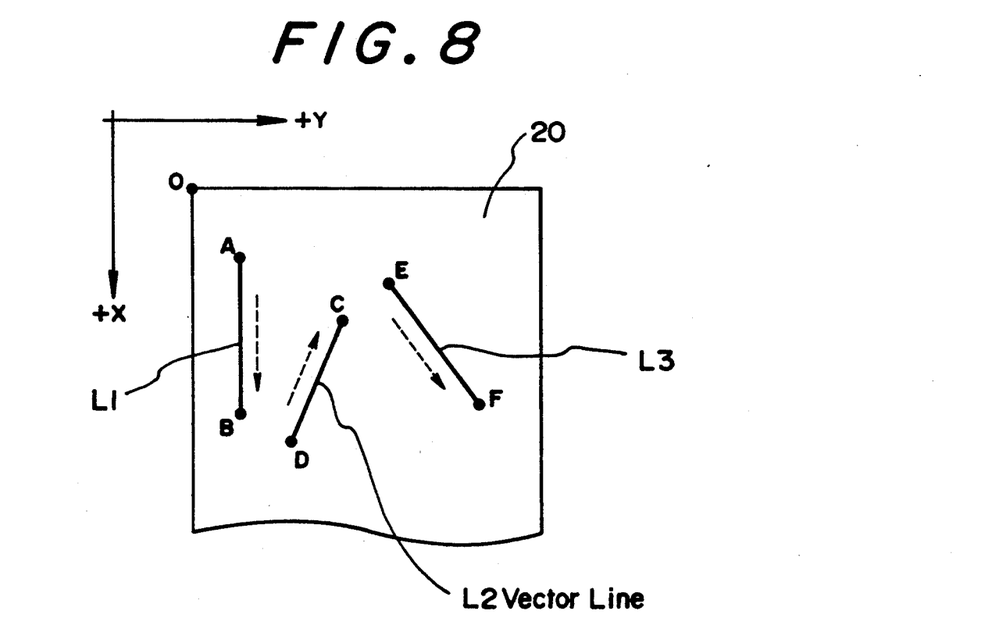
FIG. 8 is an explanation view of the prior art.
Figure 9:
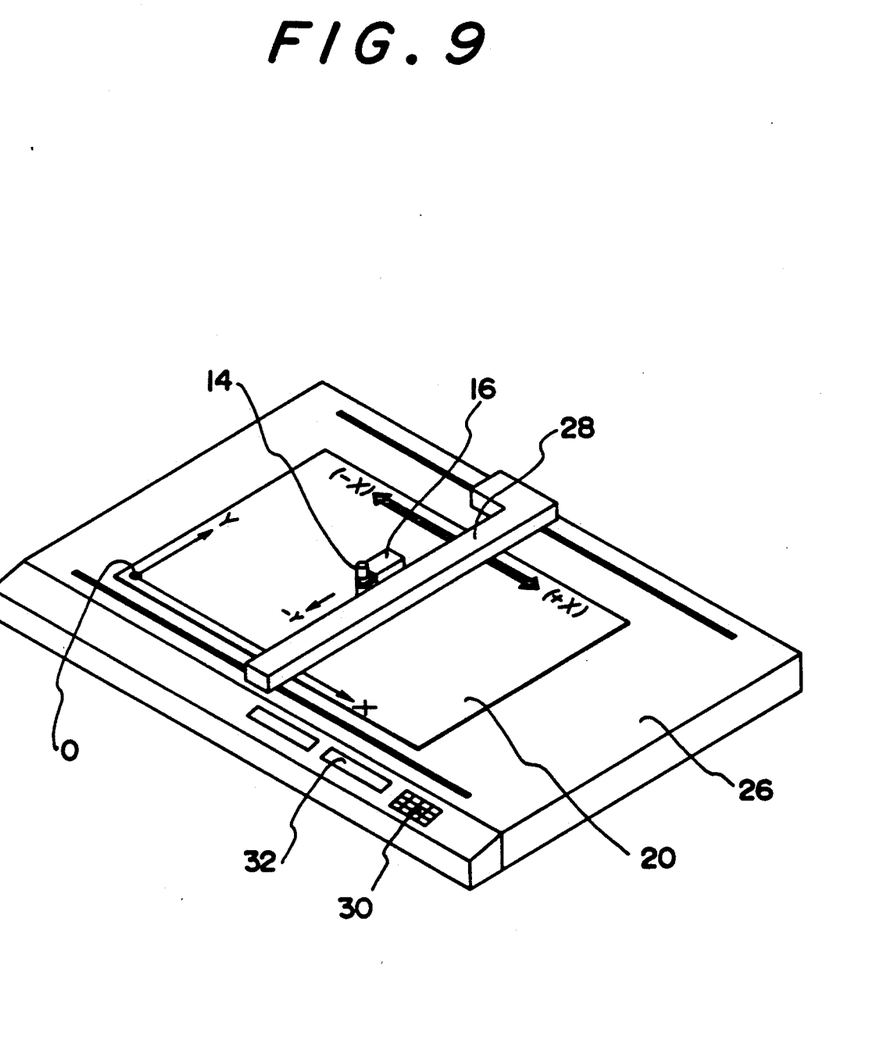
FIG. 9 is a perspective view of the flat bed type automatic drafting machine.

The flat bed type automatic drafting machine as shown in FIG. 8 has been well known.

On the basis of the drafting data transferred from the host computer to the controller, the automatic drafting machine moves the Y rail 28 repeatedly and parallely along the table 26 in the X direction. In addition, the line drafting head 16 is moved along the Y rail 28 so as to traverse the paper sheet 20 on the table 26. Thus, it is possible to draft a predetermined drawing on the paper sheet 20 by using the pen 14.

When there are vector segments $L_1$, $L_2$, and $L_3$ as shown in FIG. 8 in the drafting operation above, these vector segments are drafted according to the conventional vector sort method in order from a point A to a point B, from a point D to a point C, and from a point E to a point F with respect to an origin O. That is, the shortest distance from the XY co-ordinates is selected and a line to be drawn is drafted.

The drive roller and pressure roller of the conventional paper drive type automatic drafting machine grips a paper sheet between them. Alternative or reciprocating motion of the paper sheet along the platen in the X direction is done by a forward and reverse rotation of the drive roller so as to carry out draftings of patterns on the paper sheet. It is apt to make the paper sheet damaged by friction of the drive roller after a drafting operation for a long time and consequently the paper sheet is likely to shift or slip out of place.

That is, according to the conventional vector sort method, it is possible to shorten the drafting time, but it is not possible to shorten the repeating movement distance of the paper sheet in the X direction. As a result, the paper sheet is apt to be disadvantageously damaged according to the prior art.

According to the flat bed type automatic drafting machine, it has not been possible to shorten the reciprocating movement distance of the Y rail in the X direction. Consequently, large noise due to movement of the Y rail occurs.

It is the purpose of the present invention to solve the problems of the conventional automatic drafting machine.

SUMMARY OF THE INVENTION

A vector sort method in an automatic drafting machine operates to reduce the movement of the pen in the X-axis direction relative to a paper sheet. Consequently, the automatic drafting machine drafts in sequence the particular vector segment data of the plurality of vector segment data within one drafting range transferred to the controller of the automatic drafting machine, which particular data having end points near the origin O in the X-axis direction, except mid points and drawn end points.

DESCRIPTION OF THE PREFERRED EMBODIMENT

A drafting process of a vector-sort type according to the present invention will be described with reference to accompanying explanations and flow charts.

Figure 3:
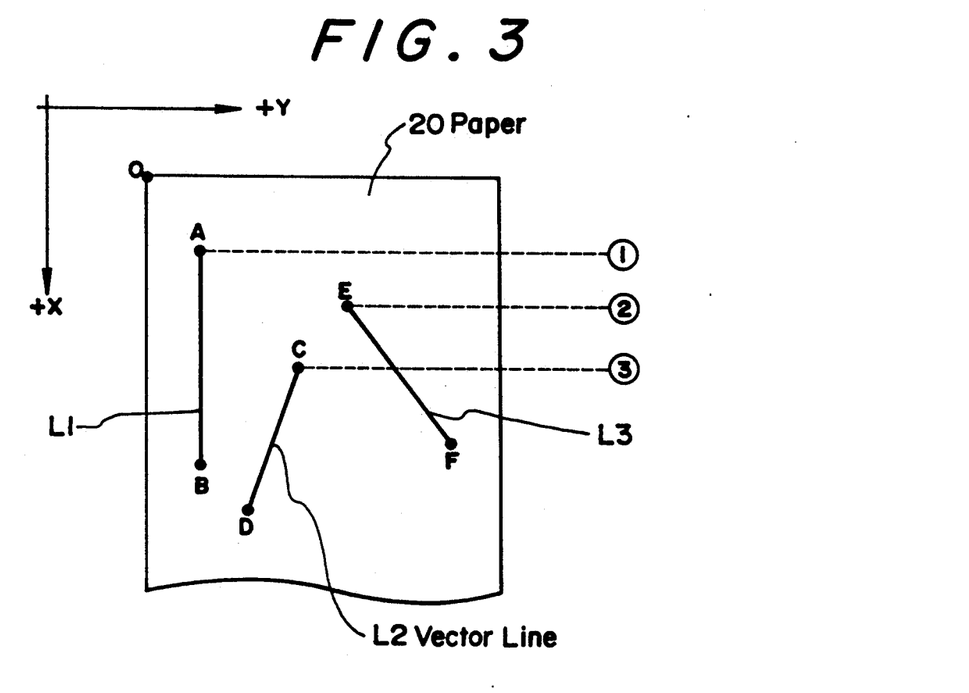
FIG. 3 illustrates a pattern for drafting.

First, the case, in which the data of the vector segments L1, L2, and L3 shown in FIG. 3 are transferred from the host computer to the controller of the automatic drafting machine and the data is drawn by the vector sort according to the present invention, will be explained in the following statement.

An origin O is used to measure the position of the pen 14 relative to the paper sheet 20 which position is determined by moving the line drawing head 16 of the paper sheet drive type automatic drafting machine along the Y rail to the left end of the sheet of FIG. 3 in order to make the X- and Y-axes counters in the controller reset to zero. A change of the relative position of the pen 14 relative to the paper sheet 20 along the X direction is generated when the paper sheet 20 moves along the platen 8 due to the revolution of the drive roller 22. A change of the position along the Y direction occurs due to the movement of the line drawing head 16 along the Y rail.

According to the flat bed type automatic drafting machine, the origin O is a position of the pen 14 on the table 26 which is obtained when the Y rail 28 moves to its limit position along −X direction in FIG. 8 and the line drawing head 16 moves to the limit position in −Y direction along the Y rail 28.

Figure 1:
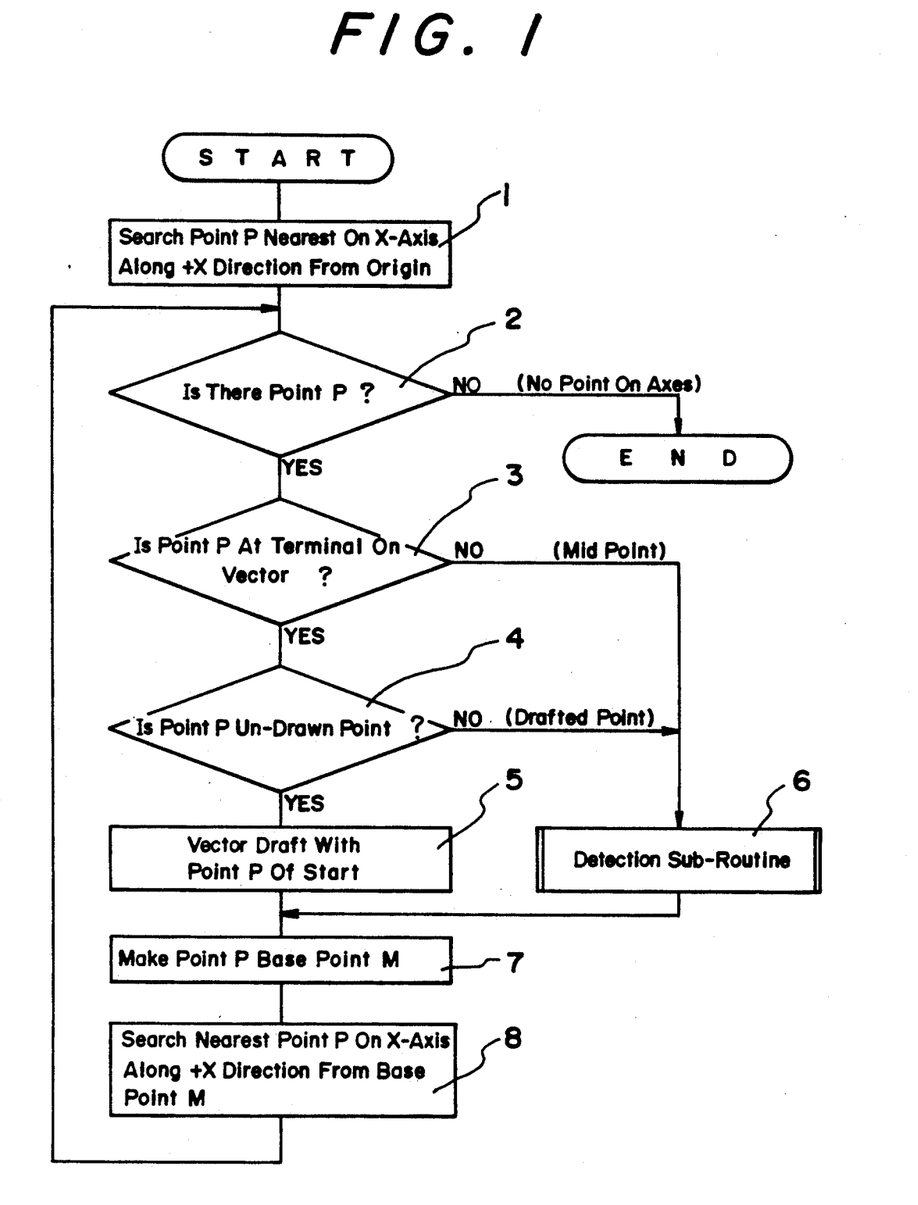
FIG. 1 is a flow chart of the operation of the automatic drafting machine according to the present invention.

According to the conventional technology, the controller searches for the nearest point P on the X co-ordinate along +X direction from the origin O at step 1 shown in the flow chart of FIG. 1. The point A of the vector segment L1 corresponds to the point P in FIG. 3. The controller judges at step 2 whether the point P exist or not. If not, the drafting operation is completed. Otherwise, the controller judges or determines at step 3 whether the point P is an end point in the vector data.

Because the point A of the vector segment L1 shown in FIG. 3 is the end point of the vector data, the controller at step 4 determines whether the point P is to be drawn or not drawn. Because the point A of the segment L1 is one not yet drawn, the controller draws at step 5 a vector segment having a starting point of the point A, or point P, on the paper sheet 20. After drawing the segment L1, the controller determines the starting point A, or the point P, to use as an initial point M at step 7. Next, the controller searches the nearest point P to the +X direction from the initial point M on the X-axis.

In FIG. 3, the point P is placed at an end point E of the vector segment L3. Next, the operation returns to step 2 and proceeds to the steps which follow step 2. In the steps above, the controller drafts a vector segment L3 having its starting point as the end point E on the paper sheet 20, and finally the vector segment L2 starting from its end point C is drawn on the sheet 20.

Summarizing the operations above, first, vector end points are searched from the origin O along the +X direction, such as the origin O→①  point A→② point E→③ point C, as shown in FIG. 3.

Second, drafting is carried out from the starting points of each of the end points found sequentially. When the segment E→F is completed, the paper sheet 20 does not move from ② to or along the −X direction provided that there is no mid point of another segment in the −X direction from ②. Similarly, when the segment C→D is completed, the paper sheet 20 does not move from ③ along the −X direction unless there is a mid point in the −X direction.

Figure 4:
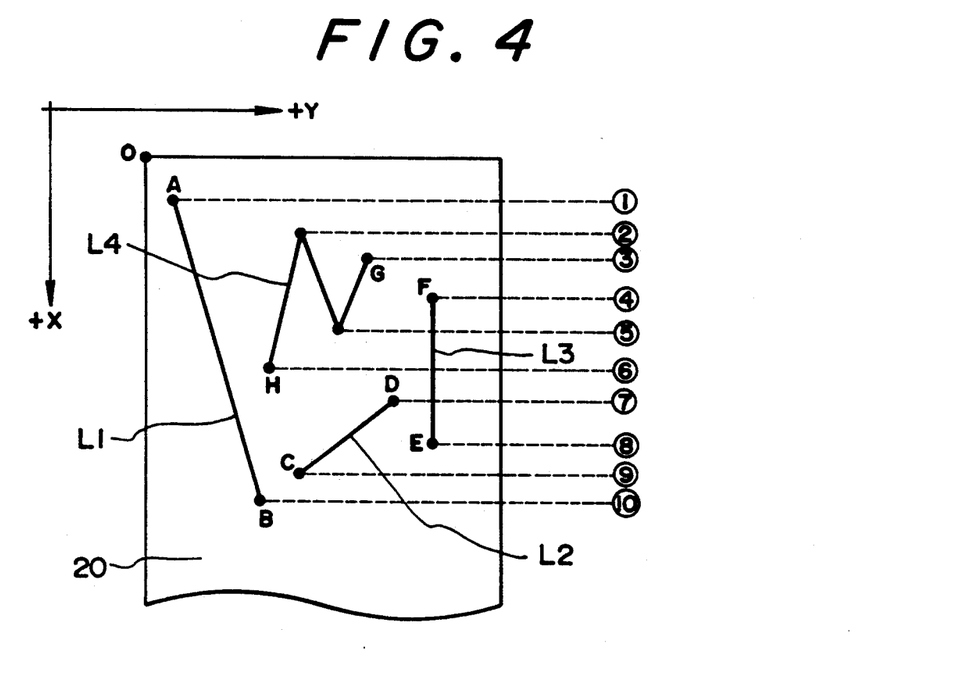
FIG. 4 illustrates a pattern for drafting.

That is, concerning the vector segments as shown in FIG. 3, as the drafting operation proceeds, less movement of the Y rail 28 or the paper is necessary. In order to deal with the vector segments (L1, L2, L3, and L4) data such as shown in FIG. 4, drafting is carried out in order of A→B, C→D, E→F, and G→H according to the vector sort method of the present invention, drafting is carried out in order A→B, G→H, F→E, and D→C. As to a searching method of the end points A, G, F, and D, first X-axis points of a vector segment are sequentially searched from the origin O toward the +X direction, only end points of the vector segments are picked up and points already drafted or determined are continuously deleted.

More specifically, a drafting procedure of the vector segments (L1, L2, L3, and L4) data to be transferred to the controller will be explained in the order of the following steps.

(1) A point A is searched from the origin O and detected at ①, and a segment A - B drafted.
(2) A mid point is detected from the point A to ②.

When controller judges a negative at the step 3 of FIG. 1, the operation proceeds to a detection subroutine of step 6 and a mid point of LA is skipped.

Figure 2:
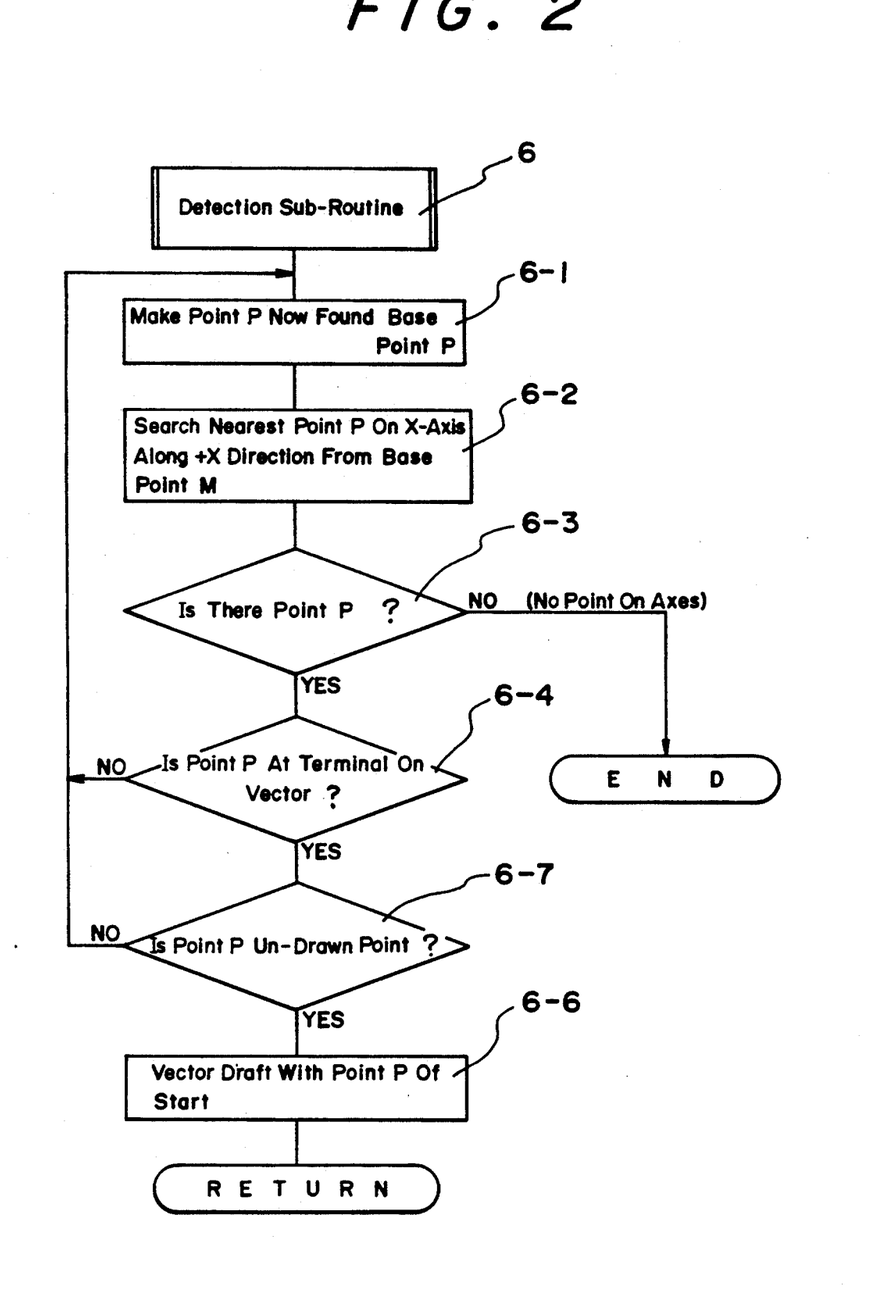
FIG. 2 is a flow chart of a subroutine of flow chart of FIG. 1.

The detection subroutine 6 above will be explained with reference to FIG. 2.

At step 6 - 1, the controller determines to use the point P found just before as a basic point M after the operation enters step 6 in the detection subroutine. Next, the controller searches for the nearest point P (point G) in the X axis along the +X direction from the basic point M at step 6 - 2. The controller judges whether there is point P or not at the step 6 - 3 shown. If not, the drafting operation is completed. Otherwise, the controller judges at step 6 - 4 whether the point P is an end point on the vector data or not. If point P is an end point, the operation proceeds to step 6 - 6 to carry out a vector drafting operation starting from the point P.

That is, (3) A point G is detected from the point ② to another point ③ and segment G - H is drawn.
(4) A point F is drawn from the point G to ④ in order to obtain a segment F - E.
(5) A mid point is detected from the point F to ⑤. The mid point is already drafted, so the mid point is skipped. This process is carried out at these steps 4 and 6 of the flow chart shown in FIG. 1.
(6) A point H is detected from the point ⑤ to a point ⑥ of FIG. 4. Because the point H has been drafted, it is skipped.
(7) A point E is detected from the point H to ⑦ in order to draft the segment D→C.
(8) A point E is detected from the point D to ⑧. Because the point E has been drafted, it is skipped.
(9) A point C is detected from the point E to ⑨. Since the point C has been drafted, it is skipped.
(10) A point B is detected from the point C to point 10. Because the point B has been already drafted, the point B is skipped.
(11) A drafting is completed after no point of co-ordinates is recognized within a range of drafting from the point B.

According to the embodiment above, end points of vector segments are searched and vector drafting operations are performed using these end points as the starting points. It is also possible to start a vector drafting operation from the nearest point of the vector segment including the end point found so as to start from the final point vector-drafted just before. In other words, considering the final point vector-drafted just before, a new vector is drafted starting from the end point near to the X direction of the vector segment which will be drafted.

For example, in FIG. 3, the drafting is carried out in the order of A→B, E→F, and C→D.

In FIG. 4 drafting is performed according to the following order:

A→B, G→H, F→E, and D→C

According to the embodiment above, at step 5 of FIG. 1, the vector segment having its end point of the point P is drafted by using an end point side near to the final point drafted just before. Other operations are identical with these shown in the flow chart of FIG. 1.

The pattern drafting method above is carried out as a soft mode sort treatment in the automatic drafting machine. The controller for automatic drafting operation can carry out a drafting according to the conventional ordinal mode or the standard sort treatment.

Concerning FIG. 5, a drafting operation starts from step 1 of Start and the operator inputs at step 2 a mode selection signal through a switch panel 30 of the automatic drafting machine. It is possible also to input the mode selection signal into the controller of the automatic drafting machine when a drafting data is transferred through the host computer.

After selection of the mode at step 3, the controller indicates the mode at step 3 in the indication or display portion 32 formed on a panel of the automatic drafting machine. Then, the controller judges or determines that the mode selected at step 4 is a soft one or not. If a soft mode treatment is selected, a soft mode sort treatment is carried out at step 5. And when it is a negative, a standard mode sort treatment is carried out at step 6.

As described above, according to the present invention, because as the vector-drafting operations proceeds, less movement along the X-axis direction of the pen relative to the paper sheet is necessary. The paper sheet is thus not damaged due to gripping of the drive roller of the paper drive type automatic drafting machine, and only little shifting of the sheets occurs. In addition, noise generated by a movement of the paper sheet along the platen can be reduced.

In addition, in operation of the flat bed type automatic drafting machine, a movement distance of the Y rail of the drafting machine is reduced resulting in a small noise which is generated by a movement of the Y rail.

What is claimed is:

1. In an automatic drafting machine comprising a line drawing head operative to move along X- and Y- axis directions relative to a paper sheet, and a writing instrument held by the line drawing head and operative to draft a pattern on the paper sheet, a vector sort drafting method comprising the steps of sorting vector segment data; and drafting in sequence starting from a terminal point of a vector segment closest to the origin along the X-axis direction.

2. In an automatic drafting machine as defined in claim 1, said method further comprising the step of detecting, in sequence, end points of a plurality of vector segment data within a predetermined drafting range.

3. A vector sort drafting method for an automatic drafting machine having a line drawing head operative to move along X- and Y-axis directions relative to an origin and to a sheet of paper, and a writing instrument held by the line drawing head and operative to draft a pattern on the sheet of paper, said method comprising the steps of:

detecting terminal points of a plurality of vector segment data which are representative of a plurality of vectors to be drafted;

sorting said detected terminal points of said plurality of vector segment data based on the distance of said terminal points from said origin in the X-axis direction; and drafting, in sequence based on said sorted terminal points of said plurality of vector segment data, said plurality of vectors using said plurality of vector segment data.

4. A vector sort drafting method for an automatic drafting machine having a line drawing head operative to move along X- and Y-axis directions relative to an origin and to a sheet of paper, and a writing instrument held by the line drawing head and operative to draft a pattern on the sheet of paper, said method comprising the steps of:

detecting terminal points of a plurality of vector segment data which are representative of a plurality of vectors to be drafted;

determining which one of said detected terminal points is closest to the origin in the X-axis direction;

drafting a first vector segment from a start point to an end point, said first vector segment having the terminal point that is determined to be closest to the origin in the X-axis direction;

determining which one of said detected terminal points is closest to the start point of said first vector segment in the X-axis direction; and drafting a second vector segment from a start point to an end point, said second vector segment having the terminal point that is determined to be closest to the start point of said first vector segment.

5. The method of claim 4, further comprising the steps of determining whether the terminal point determined to be closest to the start point of a vector segment is a mid point of a vector segment or has already been drafted.

* * * * *